(No Model.)
H. H. MONROE.
SEEDER.
No. 312,149. Patented Feb. 10, 1885.
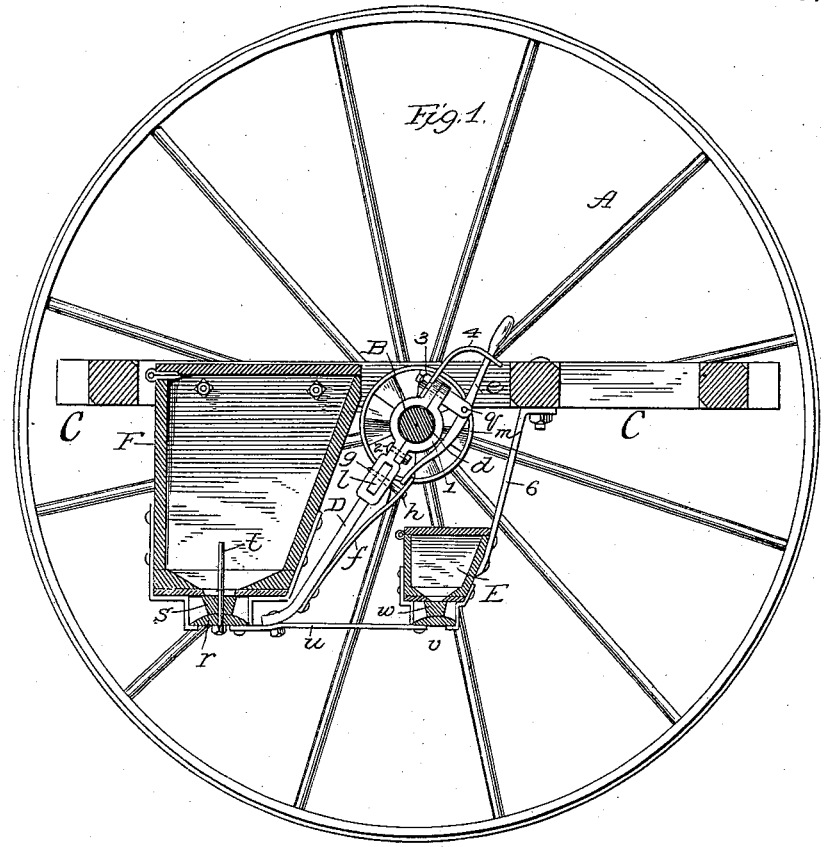
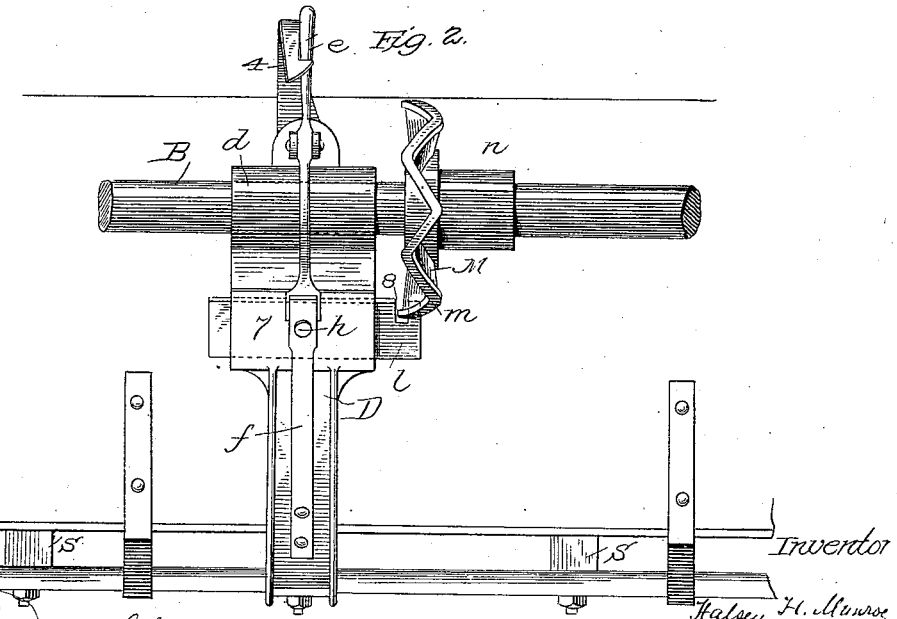

UNITED STATES PATENT OFFICE.

HALSEY H. MONROE, OF THOMASTON, MAINE.

SEEDER.

SPECIFICATION forming part of Letters Patent No. 312,149, dated February 10, 1885.

Application filed September 11, 1884. (No model.)

*To all whom it may concern:*

Be it known that I, HALSEY H. MONROE, of Thomaston, in the county of Knox and State of Maine, have invented a new and useful Improvement in Seeders; and I do hereby declare that the following is a full, clear, and exact description of the same.

My invention relates to seeders of that class in which reciprocating valves are used to regulate the flow of the seed.

The first part of the invention refers more particularly to mechanism for communicating the motion of the axle of the machine to the valve or valves, and the second part includes improvements upon the valves and in the arrangement of the box and bracket. This part includes also features shown in Letters Patent of the United States granted me on the 1st day of January, 1878.

In the accompanying drawings I have shown the best means known to me for carrying out my invention.

In these drawings, Figure 1 represents a central vertical section taken horizontally of the machine. Fig. 2 shows a plan view from below of the driving mechanism and valve with the seed-box removed.

In the drawings, A represents one of the wheels of the seeder, and B the axle, and C the frame, to which any suitable draft attachments and seat may be added.

I describe first the mechanism transmitting power to the valves.

The objects sought are simplicity in the structure, ease, freedom from friction as far as possible, and from lost motion, and quickness in moving into and out of gear. To secure these results a bracket, D, is fitted to slide on the axle, to be operated by a zigzag cam-wheel on the axle, and to be connected to the valve-bar. This bracket is formed with a two-part sleeve, $d$, on its upper end, which fits the axle, and is made sufficiently long to insure easy endwise movement on the axle without binding. The sleeve part 1 is bolted to the main part by bolts 2 and 3, bolt 3 also holding an arm, 4, in which the handle of lever $e$ is locked. Bracket D extends down near the valve-bar, to which it is connected, as shown in Fig. 1. In the bracket D is a transverse flat sleeve, 7, in which is fitted a steel bar, $l$, adapted either to slide or to be held by a pin, $h$, fitting a hole, $g$, in the sleeve and a corresponding hole in the bar. The head of the pin is held in a spring, $f$, the lower end of which is fixed to the lower end of the bracket. This spring in its normal position holds the pin in place through the bar and sleeve, whereby the sleeve and bar are connected. It may be thrown back to withdraw the pin by means of a lever, $e$, pivoted on a bracket, $q$, on the upper end of the bracket. One end of the bar $l$ is notched, as shown at 8, to receive the edge of a zigzag wheel, M, which is fixed on the axle B by hub $n$. To lessen bearing-surface, I form the edge of this wheel with flanges $m$, projecting to both sides, so that only the edges of the flange bear on the edges of the notch in the bar. Supposing the pin $h$ to be in place, the bar $l$, caused to reciprocate by the wheel M, carries the bracket, causing it to reciprocate on the axle and to give like motion to the valve-bar. If the operator desire to stop the feed, he has only to withdraw the pin by pressing in handle $e$, and may retain it withdrawn by leaving the handle in notch in the small bracket 4. Then the wheel carries only the bar $l$, and to throw this bar again into connection with the bracket the operator has only to strike the handle $e$ and force it from the notch, when the spring $f$ instantly causes the pin to enter the hole $g$ and make the connection between bar and bracket. The lower end of the bracket may carry also the valve $w$ of a grass-seed box, E, being connected to its bar $v$ by extension of the bar $u$. It will be observed that by this construction of the bracket and wheel all gears are dispensed with and lost motion avoided. It moves without noise, and is easily kept in order.

The valve mechanism has been modified, and, instead of oscillating longitudinally of the machine, oscillates laterally.

On the valve-bar $r$, I place blocks $s$, one at each port, each block when centered properly being adapted to cover its port, but when moved to either side uncovering the port in part or whole, and allowing the seed to drop upon the bar. The upper surface of the bar is made curved or beveled, as shown in Fig. 1, and the seed dropped thereon falls to front or rear.

To prevent a seed from clogging, I provide stirrer-pins $t$, set in the valve-bar, and projecting up through the port into the box. For convenience I use these pins to hold the blocks *s* to the bar, passing the pins through both. The bar *r* slides in straps, as in my aforesaid patent. The wheel M, working in a notch in the bar, gives positive motion both ways. The blocks *s* may be located in the same manner, as shown, inside the spouts, when spouts are used, and the same connections may be made with the bracket or other moving mechanism. The construction of the bracket gives another advantage. It allows the location of the seed-box below the frame, which is advantageous in leaving the platform clear, and brings the lower part of the box nearer the ground.

I claim—

1. A bracket adapted to slide upon the axle and connected to the valve-bar of a seeder, in combination with means for giving it reciprocating lateral movement, substantially as set forth.

2. A bracket adapted to slide on the axle and connected to the valve-bar of a seeder, in combination with a zigzag wheel fixed to the axle.

3. A bracket adapted to slide on the axle and connected to the valve-bar of a seeder, said bracket being provided with a sleeve and bar *l*, sliding in said sleeve, in combination with a pin and mechanism for operating the same, and with a zigzag wheel fixed to the axle connected to the bar, all substantially as described.

4. The bracket D, adapted to slide on the axle, having sleeve and bar *l*, provided with holes, and means for giving the bar reciprocating motion, the spring *f* and pin, and the lever *e*, all substantially as described.

5. In connection with the seed-box, a curved or beveled valve-bar provided with valve-blocks *s*, said bar being suspended below the box in straps, and combined with means for imparting to it reciprocating motion, all substantially as described.

6. The valve-bar and valve-block provided with holes and combined with the stirring-pin *t*, said pin serving to connect the block and bar, substantially as described.

In testimony whereof I have signed my name to this specification in the presence of two subscribing witnesses.

HALSEY H. MONROE.

Witnesses:
WALTER DONALDSON,
W. E. WILLIAMS.